Oct. 5, 1971   J. F. COWEN   3,609,780
HONEYCOMB DECAPPING APPARATUS
Filed June 3, 1968   3 Sheets-Sheet 1
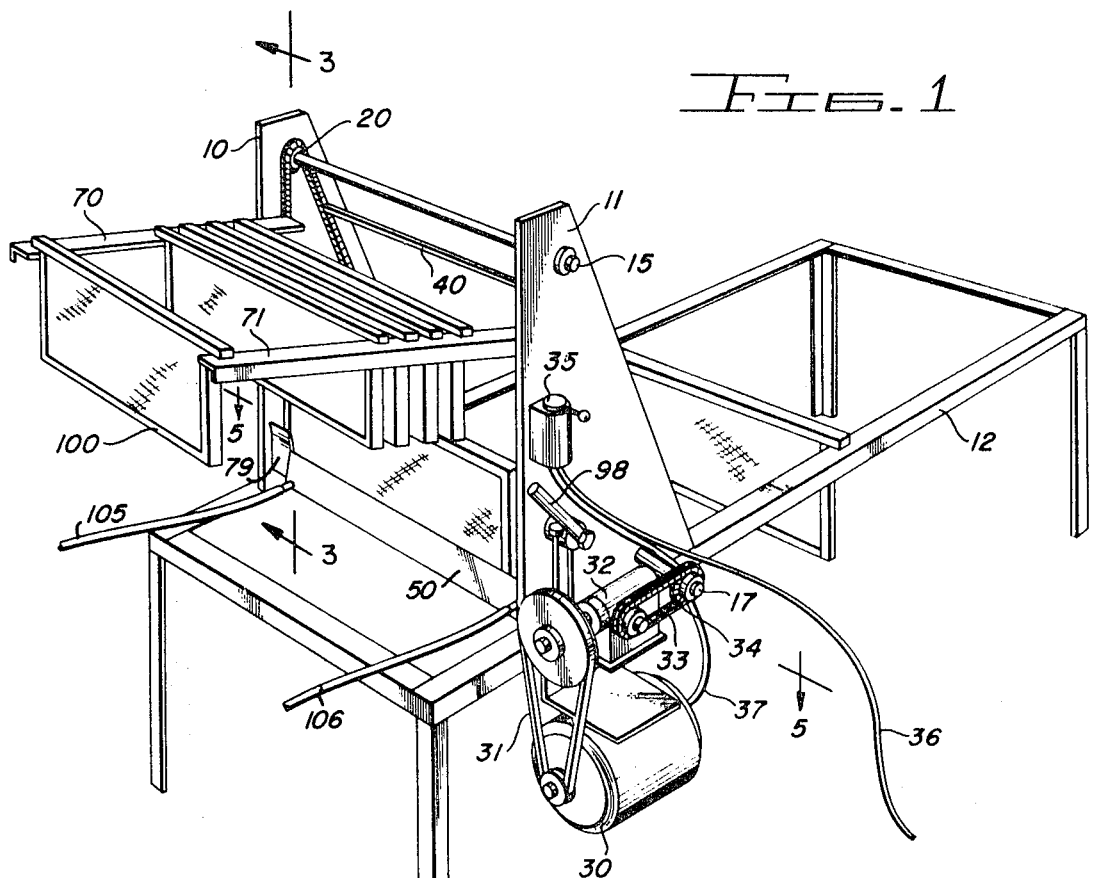
INVENTOR.
JOHN F. COWEN
BY
Drummond & Cahill
ATTORNEYS Oct. 5, 1971 J. F. COWEN 3,609,780
HONEYCOMB DECAPPING APPARATUS
Filed June 3, 1968 3 Sheets-Sheet 2
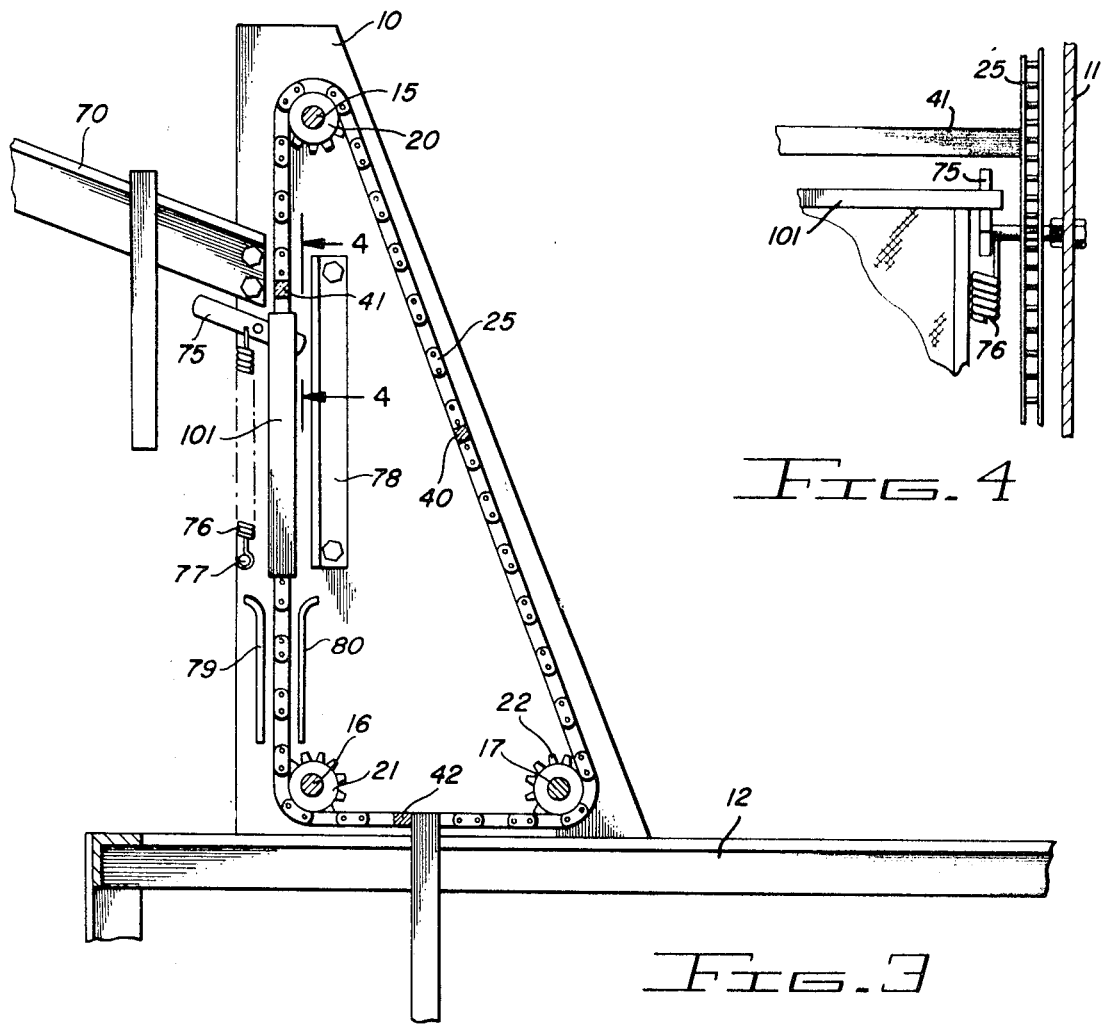
FIG. 3
FIG. 4
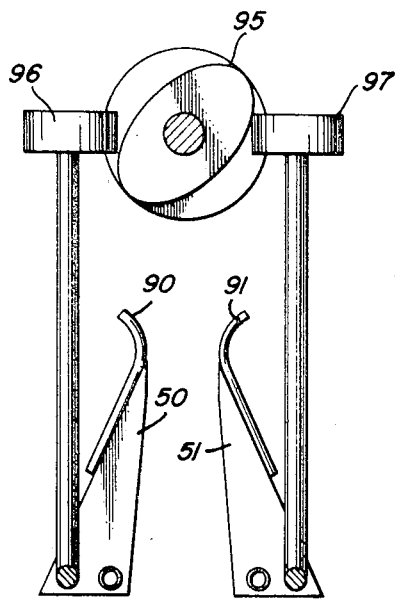
FIG. 7
INVENTOR.
JOHN F. COWEN
BY
Drummond & Cahill
ATTORNEYS Oct. 5, 1971  J. F. COWEN  3,609,780
HONEYCOMB DECAPPING APPARATUS
Filed June 3, 1968  3 Sheets-Sheet 3

INVENTOR.
JOHN F. COWEN
BY
Drummond & Cahill
ATTORNEYS

United States Patent Office 3,609,780
Patented Oct. 5, 1971

3,609,780
HONEYCOMB DECAPPING APPARATUS
John F. Cowen, P.O. Box 206, Parowan, Utah 84761
Filed June 3, 1968, Ser. No. 733,901
Int. Cl. A01k 59/02
U.S. Cl. 6—12 A                                    8 Claims

ABSTRACT OF THE DISCLOSURE

A frame assembly is utilized to support a pair of endless chains between which drive bars are connected. The drive bars are driven downwardly by the chains and contact the top of a honeycomb decapper and forces the honeycomb between a pair of reciprocating, heated, decapping knives. A platform supports a plurality of honeycombs in position to be fed into engagement with the drive bars; the honeycombs drop from the edge of the platform onto spring-biased support members and are held by the support members until a drive bar engages the upper portion of the honeycomb. Motion of the drive bar causes pivoting of the support members against the force of the bias spring.

---

The present invention pertains to honeycomb decapping machines, and more particularly, to a device that automatically and accurately removes wax covering the cells of a honeycomb.

In the production and handling of honey, the wax deposited on the surface of a honeycomb must be removed to gain access to the honey therein. Beekeepers with a limited number of hives "decap" the honeycombs by using an electrically heated knife. The operation is usually performed by hand. In larger beekeeping establishments, machines for automatically removing the wax or decapping the honeycombs have been developed. These machines become very complex and very expensive. The expense usually militates against the purchase of such apparatus by the smaller beekeeping establishments.

It is therefore an object of the present invention to provide a honeycomb decapping apparatus that is very simple and inexpensive.

It is another object of the present invention to provide an automatic honeycomb decapping machine that can conveniently decap honeycombs without attention by the operator.

It is still another object of the present invention to provide a honeycomb decapping machine which can reliably and precisely remove the wax cap on honeycombs.

These and other advantages of the present invention will become apparent to those skilled in the art as the description thereof proceeds.

Briefly, in accordance with the embodiment chosen for illustration, a frame assembly is provided having a pair of upstanding side plates supporting three shafts journalled therein. A pair of flexible endless chains are mounted on sprockets on the shafts. Drive bars are connected between the chains and extend from one side plate to the other. The drive bars travel with the chains and are utilized to contact a frame containing honeycombs and force the latter through a pair of decapping knives. The knives are heated such as by steam and are continuously reciprocated to insure an accurate, rapid and clean "slicing" action. The decapped combs mounted in the frame pass through the knife and subsequently come to rest on a conveyor table where the drive bar pushes the frame rearwardly away from the decapping apparatus.

The present invention may more readily be described by reference to the accompanying drawings, in which:

FIG. 1 is a perspective view of a honeycomb decapping machine constructed in accordance with the teachings of the present invention.

FIG. 2 is a partial side elevational view of FIG. 1 showing portions of the apparatus thereon in an enlarged scale.

FIG. 3 is a partial cross-sectional view of FIG. 1 taken along line 3—3.

FIG. 4 is a cross-sectional view of a portion of FIG. 3 taken along line 4—4.

FIG. 7 is a side elevational view of a portion of the apparatus of FIG. 1 with one side wall removed to show the relationship of the decapping knives and the adjustment thereof.

Figure 5:
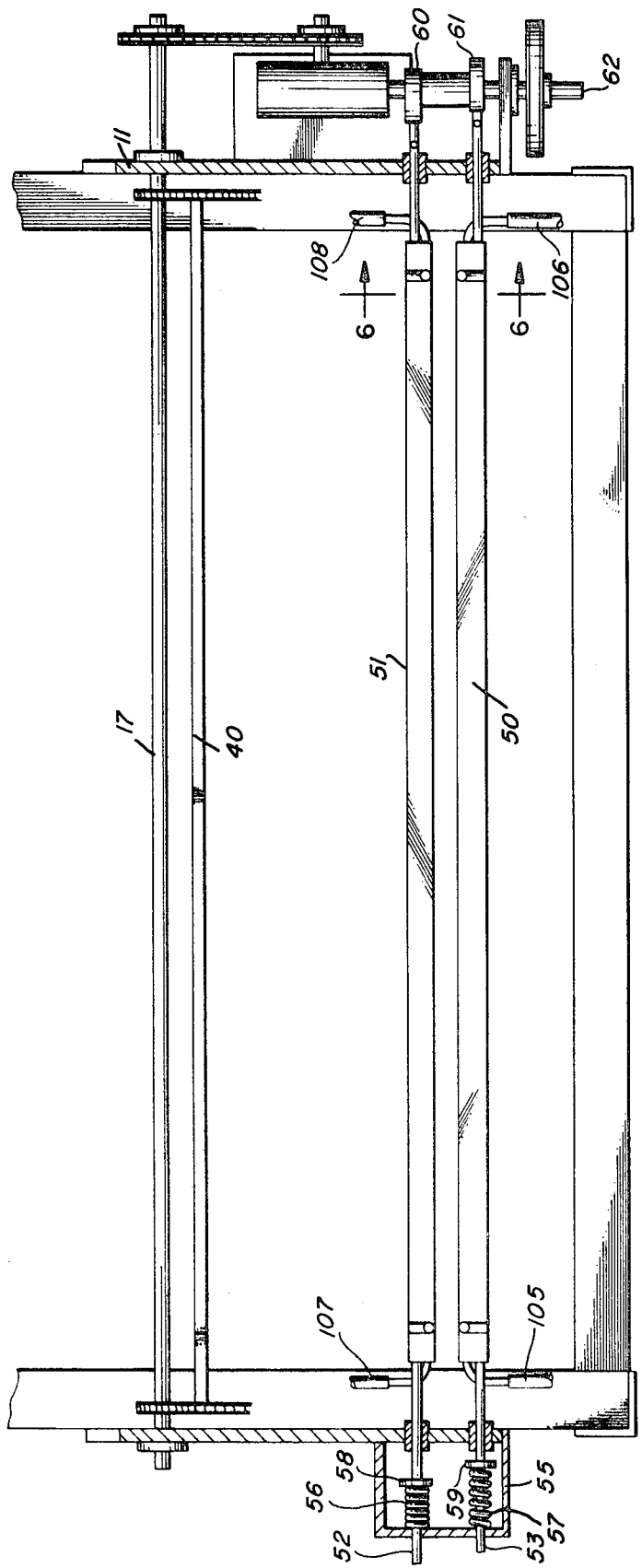
FIG. 5 is a partial cross-sectional view, on an enlarged scale, of the apparatus of FIG. 1 taken along line 5—5 with the honeycomb removed.
Figure 6:
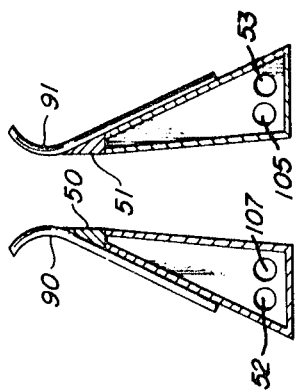
FIG. 6 is a cross-sectional view of FIG. 5 taken along line 6—6.

Referring now to the drawings, the apparatus of the present invention includes a frame assembly having side walls 10 and 11 mounted on a conveyor table 12. The side walls 10 and 11 provide a means for journalling shafts 15, 16, and 17. These shafts extend from one side plate to the other and each includes a pair of sprockets such as those shown at 20, 21, and 22, over which is mounted an endless flexible chain such as shown at 25. The endless chain is driven by means of the shaft 17 which, in turn, is driven by an electric motor 30 through a V-belt 31, a gear reduction unit 32, flexible chain 33, and sprocket 34. A motor control 35 is appropriately connected to a source of power through an electrical conduit 36 and provides a means for applying current to the motor 30 through the conduit 37.

A plurality of drive bars 40, 41, and 42 are connected to the chains and extend from one chain to the other to bridge the gap between side plates 10 and 11. Thus, as the chains are driven in synchronism by the shaft 17, the drive bars travel over the shaft 17, upwardly over the shaft 15; downwardly over the shaft 16, and again toward the shaft 17. A pair of decapping knives 50 and 51 are mounted between the side plates 10 and 11 and are journalled therein for sliding motion longitudinally of the respective knives. The knives include knife bars 52 and 53 respectively, which extend through appropriate bushings in the side plates 10 and 11. The knife bars extend through a box member 55 which provides a means for housing a pair of biasing springs 56 and 57. Each of the biasing springs is positioned concentrically over one of the bars 52 and 53 and abuts the housing 55 at one end thereof and spring stop 58 and 59 respectively at the other end thereof. Thus, the springs each urge the corresponding knife bar to the right as shown in FIG. 5.

The opposite end of each knife bar is held in contact with a corresponding cam 60 and 61 by reason of the biasing spring associated therewith. The cams 60 and 61 are mounted on a shaft 62 which is driven by the V-belt 31. Thus, as the shaft 62 is rotated, the cams 60 and 61 alternately urge the contacting knife bar to the left as seen in FIG. 5.

A feeding platform comprising a pair of channel members 70 and 71 is connected to the side plates 10 and 11 and extends therefrom at an upwardly inclined angle. A pair of support members such as member 75 are pivotally connected to a respective one of the side plates 10 and 11 and are spring-biased to a position as shown in FIG. 3 by a tension spring 76 secured at one end to the support member 75 and the other end to a pin 77 fastened to the support plate 10. A backup plate 78 is provided for reasons that will become apparent, as are guide plates 79, 80 and 81.

The blades 50 and 51 include guide extensions 90 and 91 respectively and are adjustable in that the opening between the blades is determined by the position of a camming surface 95 contacting a pair of cam follows 96 and 97, each of which is connected to the knife bar of a different one of the blades. The cam 95 may conveniently be positioned by a handle 98 to provide any desired opening, to thereby insure complete removal of the wax.

The operation of the device may now be described. A plurality of frames, such as frame 100, is mounted between feeding platform channels 70 and 71. The frames slide by gravity toward the endless chains and the first frame, such as the frame 101 shown in FIG. 3, slides off the end of the channels onto the support members, such as support member 75. The biasing spring 76 is sufficiently strong to hold the honeycombs in the position shown in FIG. 3 until the drive bar 41 contacts the top of the honeycombs. Further motion of the chains causes the drive bar 41 to force the honeycombs downwardly to overcome the biasing force and subsequently through the decapping knives. The knives are heated by steam or hot water introduced into conduits 105, 106, and 107 and 108. As the combs pass between the knives, the rotation of the shaft 62 causes the cams 60 and 61 to impart reciprocatory motion to each of the knives; the motion is such that the knives are moving in opposite directions at any given instant. After the combs have moved past the knife, the decapped combs mounted in the honeycomb frame come to rest on the conveyor table 12 and are driven to the right, as shown in FIG. 3, until the drive bar 41 has passed over the shaft 17. The next honeycomb has been positioned on the spring-biased support members and may be driven through the operation described above by the next succeeding drive bar. The operation thus continues and the framed honeycombs are moved rearwardly on the conveyor table 12 by the force of the next succeeding honeycomb. The backup plate 78 prevents honeycombs from falling off the spring-biased support members and maintains the top thereof in a driving position relative to the knife bar; the guide plate 79 and 80 guide the bottom of the honeycomb frame to insure that the honeycombs are sufficiently aligned as they enter the decapping area. The extent or depth of the decapping may be adjusted to suit the individual environment encountered for a group of honeycombs by setting the lever 98, thus adjusting the distance between the cutting edges of the knives.

It will be obvious to those skilled in the art that a variety of specific elements shown in the accompanying embodiment chosen for illustration may be varied or changed without departing from the spirit and scope of the invention. For example, the flexible chains may conveniently be other flexible drive members and the feeding platform may take a variety of specific shapes. It is therefore intended that the present invention be limited only by the scope of the claims appended hereto.

I claim:

1. A honeycomb decapping apparatus comprising: a frame assembly supporting a pair of flexible drive members having a plurality of drive bars extending therebetween; a pair of longitudinally reciprocable decapping knives mounted on said frame and adjustably positioned to permit said drive bars to pass therebetween; drive means connected to said flexible drive members; reciprocating means connected to said drive means for reciprocating said decapping knives; a feeding platform connected to said frame and extending therefrom for supporting honeycombs to be decapped, said platform terminating adjacent said flexible drive members to permit honeycombs to slide off the end thereof; backup support means on said frame on the side of said drive member opposite said end of said platform; a spring-biased support member mounted on said frame and positioned adjacent and below said feeding platform to catch and support honeycombs sliding off said platform in the path of said drive bars; said support member pivotable against said spring bias to permit said drive bars to force honeycombs off said support member and into said decapping knives.

2. The combination set forth in claim 1 wherein said flexible drive means comprise endless chains.

3. The combination set forth in claim 1 wherein said reciprocating means comprises a pair of cams, each contacting an end of a different one of said knives to reciprocate said knives each about its respective longitudinal axis, and resilient spring means secured to each of said knives to insure contact between the ends of said knives and said pair of cams.

4. The combination set forth in claim 1 wherein said knives are reciprocated out of phase with each other.

5. The combination set forth in claim 1 wherein said feeding platform comprises a pair of support arms, each extending from said frame assembly and spaced to permit a honeycomb supported thereby to extend therebetween.

6. The combination set forth in claim 1 including a pair of said support members, each positioned adjacent a different one of said flexible drive members.

7. In a honeycomb decapping apparatus, the improvement comprising: a frame assembly supporting a pair of flexible drive members, each extending in a plane parallel to the other; a plurality of drive bars extending between said drive members perpendicular to said planes, said drive bars secured at either end thereof to said drive members; drive means connected to said flexible drive members; a feeding platform connected to said frame on one side of said drive members and extending therefrom and inclined upwardly for supporting honeycombs to be decapped, said platform terminating adjacent said flexible drive members to permit honeycombs to slide off the end thereof; a support means mounted on said frame adjacent the side of the drive members opposite said feeding platform to catch and support honeycomb sliding off said platform in the path of said drive bars, said support member positionable to permit said drive bars to force honeycomb off said support member.

8. The combination set forth in claim 1, wherein said decapping knives include guide extensions extending therefrom to contact honeycombs and guide the latter as they come into contact with said decapping knives.

References Cited
UNITED STATES PATENTS

| | | | |
|---|---|---|---|
| 711,223 | 10/1902 | Miller | 6—12U |
| 2,807,034 | 9/1957 | Fox | 6—12U |
| 3,388,409 | 6/1968 | Hettrick | 6—12U |

LUCIE H. LAUDENSLAGER, Primary Examiner